US010201801B2

(12) United States Patent
Ko et al.

(10) Patent No.: US 10,201,801 B2
(45) Date of Patent: Feb. 12, 2019

(54) HYBRID WATER TREATMENT AGENT OF β-MANGANESE DIOXIDE NANOPARTICLES AND CARBON NANOTUBE, PREPARATION METHOD THEREFOR, WATER TREATMENT APPARATUS USING SAME, AND UNDERGROUND WATER IN SITU TREATMENT APPARATUS

(71) Applicant: UNIVERSITY-INDUSTRY COOPERATION GROUP OF KYUNG HEE UNIVERSITY, Gyeonggi-do (KR)

(72) Inventors: Seok-Oh Ko, Gyeonggi-do (KR); Seoktae Kang, Gyeonggi-do (KR); Do-Gun Kim, Gyeonggi-do (KR)

(73) Assignee: UNIVERSITY-INDUSTRY COOPERATION GROUP OF KYUNG HEE UNIVERSITY., Gyeonggi-do (KR)

( * ) Notice: Subject to any disclaimer, the term of this patent is extended or adjusted under 35 U.S.C. 154(b) by 274 days.

(21) Appl. No.: 15/321,616

(22) PCT Filed: Jun. 22, 2015

(86) PCT No.: PCT/KR2015/006276

§ 371 (c)(1),
(2) Date: Dec. 22, 2016

(87) PCT Pub. No.: WO2015/199389

PCT Pub. Date: Dec. 30, 2015

(65) Prior Publication Data

US 2017/0144129 A1 May 25, 2017

(30) Foreign Application Priority Data

Jun. 25, 2014 (KR) ........................ 10-2014-0078351

(51) Int. Cl.
*B01D 15/08* (2006.01)
*B01J 20/02* (2006.01)
(Continued)

(52) U.S. Cl.
CPC .............. *B01J 20/20* (2013.01); *B01D 15/08* (2013.01); *B01J 20/0222* (2013.01);
(Continued)

(58) Field of Classification Search
CPC ....... B01D 15/08; B01J 20/0222; B01J 20/20; B01J 21/185; B01J 23/34; B01J 35/002;
(Continued)

(56) References Cited

FOREIGN PATENT DOCUMENTS

| | | | |
|---|---|---|---|
| KR | 10-2011-0012845 | 2/2011 | ............... C08K 3/04 |
| KR | 10-2011-0033733 | 3/2011 | ............... B82B 3/00 |
| KR | 10-2011-0047644 | 5/2011 | ............... B82B 1/00 |

OTHER PUBLICATIONS

Saleh, T., et al. (2012) "Column with CNT/magnesium oxide composite for lead(II) removal from water." *Environ. Sci. Pollut. Res.*, 19:1224-1228.

(Continued)

*Primary Examiner* — Lucas A Stelling

(74) *Attorney, Agent, or Firm* — Harness, Dickey & Pierce, P.L.C.

(57) ABSTRACT

The present invention relates to a water treatment agent, a preparation method therefor, a water treatment apparatus using the same, and an in-situ groundwater treatment apparatus and, more specifically, to: a water treatment agent comprising a carbon nanotube support, and β-manganese dioxide nanoparticles adsorbed on the carbon nanotube support and having a particle size of 1,000 nm or less; a preparation method therefor; a water treatment apparatus using the same; and an in-situ groundwater treatment apparatus.

11 Claims, 7 Drawing Sheets

(51) Int. Cl.

| | |
|---|---|
| ***B01J 20/20*** | (2006.01) |
| ***B01J 21/18*** | (2006.01) |
| ***B01J 23/34*** | (2006.01) |
| ***B01J 35/02*** | (2006.01) |
| ***B01J 37/02*** | (2006.01) |
| ***B01J 37/04*** | (2006.01) |
| ***B01J 37/06*** | (2006.01) |
| ***B01J 37/08*** | (2006.01) |
| ***C02F 1/28*** | (2006.01) |
| ***C02F 1/72*** | (2006.01) |
| ***C02F 1/76*** | (2006.01) |
| ***C02F 1/78*** | (2006.01) |
| ***C02F 1/68*** | (2006.01) |
| ***B01J 35/00*** | (2006.01) |
| *C02F 1/32* | (2006.01) |
| *C02F 1/34* | (2006.01) |
| *C02F 1/30* | (2006.01) |
| *C02F 1/36* | (2006.01) |
| *C02F 101/20* | (2006.01) |
| *C02F 103/06* | (2006.01) |

(52) U.S. Cl.

CPC ............. *B01J 21/185* (2013.01); *B01J 23/34* (2013.01); *B01J 35/002* (2013.01); *B01J 35/023* (2013.01); *B01J 37/0211* (2013.01); *B01J 37/04* (2013.01); *B01J 37/06* (2013.01); *B01J 37/08* (2013.01); *C02F 1/288* (2013.01); *C02F 1/68* (2013.01); *C02F 1/722* (2013.01); *C02F 1/725* (2013.01); *C02F 1/76* (2013.01); *C02F 1/78* (2013.01); *C02F 1/281* (2013.01); *C02F 1/283* (2013.01); *C02F 1/305* (2013.01); *C02F 1/307* (2013.01); *C02F 1/32* (2013.01); *C02F 1/34* (2013.01); *C02F 1/36* (2013.01); *C02F 2101/20* (2013.01); *C02F 2103/06* (2013.01); *C02F 2305/08* (2013.01)

(58) Field of Classification Search

CPC ...... B01J 35/023; B01J 37/0211; B01J 37/04; B01J 37/06; B01J 37/08; C02F 1/281; C02F 1/283; C02F 1/288; C02F 1/305; C02F 1/307; C02F 1/32; C02F 1/34; C02F 1/36; C02F 1/68; C02F 1/722; C02F 1/725; C02F 1/76; C02F 1/78; C02F 2101/20; C02F 2103/06; C02F 2305/08

See application file for complete search history.

(56) References Cited

OTHER PUBLICATIONS

International Search Report (ISR) dated Sep. 10, 2015 in PCT/KR2015/006276 published as WO 2015/199389 with English Translation.

Written Opinion (WO) dated Sep. 10, 2015 in PCT/KR2015/006276 published as WO 2015/199389.

HYBRID WATER TREATMENT AGENT OF β-MANGANESE DIOXIDE NANOPARTICLES AND CARBON NANOTUBE, PREPARATION METHOD THEREFOR, WATER TREATMENT APPARATUS USING SAME, AND UNDERGROUND WATER IN SITU TREATMENT APPARATUS

CROSS-REFERENCE TO RELATED APPLICATIONS

This application is a national phase application of PCT Application No. PCT/KR2015/006276, filed on Jun. 22, 2015, which claims benefit of Korean Patent Application No. KR 10-2014-0078351 filed Jun. 25, 2014. The entire disclosures of the applications identified in this paragraph are incorporated herein by references.

FIELD

The present disclosure relates to a hybrid water treatment agent of β-manganese dioxide nanoparticles and carbon nanotubes, a preparation method thereof, and a water treatment apparatus and an in-situ groundwater treatment apparatus using the same, and more particularly, to a hybrid water treatment agent including a carbon nanotube support having β-manganese dioxide nanoparticles immobilized thereon, with excellent removal performance of toxic trace elements and organic pollutants in water, a preparation method thereof, and a water treatment apparatus and an in-situ groundwater treatment apparatus using the same.

BACKGROUND

With the development of industrial society, various types of pollutants have been increasing in water from streams, lakes, and underground. Thus, as an amount of water resources of good quality reduces, drinking water production becomes more difficult, and available water resources reduces, the need to re-use treated wastewater dramatically increased.

Particularly, in recent years, toxic trace elements such as heavy metals, pharmaceuticals and personal care products (PPCPs), and endocrine disrupting chemicals (EDCs) increase in water from streams, lakes and underground, and effluent in treated wastewater, which threatens the production of drinking water of good quality and water re-use. Because toxicity of toxic trace elements is high even at a low concentration, toxic trace elements must be removed in a water purification process and a water recycling process. Typical examples of heavy metals include lead, cadmium, and chrome, typical examples of pharmaceuticals and personal care products include ibuprofen, acetaminophen, oxytetracycline, and caffeine, and typical examples of endocrine disrupting chemicals include 17α-ethinylestradiol (EE2), 17β-estradiol (E2), estrone (E1), and bisphenol A (BPA).

As opposed to other pollutants, toxic trace elements are not removed in general water purification and sewage and wastewater treatment processes. To remove toxic trace elements, coagulation, adsorption, biological treatment, ion exchange, membranes, and advanced oxidation processes (AOPs) are being attempted. However, they have problems such as low efficiency, high costs and secondary pollution, which limit the commercialization. Particularly, activated carbon is primarily used in a water purification process and a sewage and wastewater treatment process, and activated carbon has good adsorption performance of organic pollutants, but when organic pollutants more than a maximum adsorption capacity are adsorbed (saturated), saturated activated carbon cannot adsorb and remove an amount of pollutants any more. The saturated activated carbon needs to be replaced with new activated carbon. It is possible to reactivate saturated activated carbon, but a large amount of energy and costs is required for reactivation, secondary pollutants are created, and a partial loss occurs during reactivation. Also, activated carbon is known as having low adsorption performance of toxic trace elements.

Recently, to remove toxic trace elements, metal oxide nanoparticles are gaining attention. Metal oxide nanoparticles generally refer to particles having an individual particle size of 100 nm or less, and iron oxide, iron oxide and iron hydroxide, titanium oxide, and manganese oxide particles are mainly being studied. In the removal of pollutants in the water, attempts are being made to use metal oxide nanoparticles in a variety of applications, for example, catalysts, adsorbents, and ion exchange materials, and in particular, more recently, attention is being paid to metal oxide nanoparticles as heterogeneous catalysts or adsorbents for organic pollutants oxidation/reduction.

Advantages of metal oxide nanoparticles are as follows. Firstly, a specific surface area is large, reactive sites and adsorption sites are rich on the surface, and organics oxidative removal performance and heavy metals adsorptive removal performance is very high. For example, research has reported that iron oxide nanoparticles have a phenol removal rate about 35 times higher than and an ethylene glycol removal rate 2 times to 4 times higher than the Fenton oxidation process traditionally used to remove non-biodegradable organics (Zelmanov and Semiat, 2008). Also, it was reported that micro-sized zinc oxide is incapable of adsorb and remove arsenic (As), but nano-sized zinc oxide has good arsenic adsorption and removal performance (Tiwari et al., 2008). Secondly, because pollutant removal efficiency per unit weight is high due to a large specific surface area, when removing the same amount of pollutants, an amount of injection is lower than particles having a larger particle size, so it may be used with economic efficiency.

However, metal oxide nanoparticles are difficult to commercialize due to the following drawbacks. Firstly, it takes a large amount of energy and toxic chemicals such as acid or alkali, an oxidant or a reducing agent, and a dispersant to prepare metal oxide nanoparticles, so there is a high likelihood that environment pollution and a safety-related problem will occur in the preparation process. Secondly, because nanoparticles have a small size less than or equal to 100 nm, they are difficult to separate by precipitation and filtration. That is, when nanoparticles are fed into a reactor for water treatment, they are released into water bodies together with treated water after treatment of pollutants and contaminate water from streams, lakes, and underground.

DISCLOSURE

Technical Problem

The present disclosure is directed to providing a water treatment agent, in which β-manganese dioxide nanoparticles are immobilized on carbon nanotubes capable of adsorbing organic pollutants, leading to outstanding adsorption performance and oxidative removal performance of organic pollutants, and the β-manganese dioxide nanoparticles are immobilized and supported on a carbon nanotube support, thereby preventing leakage from a reactor and enabling applicability to a commercialization process, a preparation method thereof, and a water treatment apparatus and an in-situ groundwater treatment apparatus using the same.

Technical Solution

To achieve the object, according to one aspect of the present disclosure, there is provided a water treatment agent including a carbon nanotube support, and β-manganese dioxide nanoparticles immobilized on the carbon nanotube support, in which the β-manganese dioxide nanoparticles have a particle size less than or equal to 1,000 nm.

In this instance, the β-manganese dioxide nanoparticles may have a size of from 1 nm to 100 nm.

Also, the β-manganese dioxide nanoparticles may be formed singularly, or by agglomerating at least two particles.

Also, the water treatment agent may further include an oxidant.

Here, the oxidant may be any one selected from the group consisting of hydrogen peroxide ($H_2O_2$), ozone ($O_3$), sodium hypochlorite (NaOCl), ultraviolet light, electron beam, γ-ray, hydrodynamic cavitation and sonication, or mixtures thereof.

On the other hand, according to another aspect of the present disclosure, there is provided a method of preparing a water treatment agent including (S1) mixing potassium permanganate, distilled water, alcohol and a carbon nanotube support to prepare a mixed solution, and (S2) heat-treating the mixed solution at 120 to 200° C. for 15 to 36 hours, to form a carbon nanotube support having β-manganese dioxide nanoparticles of a particle size less than or equal to 1,000 nm immobilized thereon.

Here, the method of preparing a water treatment agent may further include, after the step (S2), (S3) heat-treating the carbon nanotube support having β-manganese dioxide nanoparticles immobilized thereon at 250 to 500° C. for 2 to 8 hours.

Also, a weight ratio of the potassium permanganate and the distilled water may be from 1:50 to 1:200, and a volume ratio of the distilled water and the alcohol may be from 1:20 to 1:150.

On the other hand, according to still another aspect of the present disclosure, there is provided a water treatment apparatus including a reaction tank, wherein the reaction tank is filled with the foregoing water treatment agent of the present disclosure.

Furthermore, according to further another aspect of the present disclosure, there is provided an in-situ groundwater treatment apparatus including a permeable reactive barrier, wherein the permeable reactive barrier is filled with the foregoing water treatment agent of the present disclosure.

Advantageous Effects

According to the present disclosure, as the β-manganese dioxide nanoparticles are supported on the carbon nanotube support capable of adsorbing organic pollutants, adsorptive removal and oxidative removal may be concurrently achieved, thereby improving removal rates of organic pollutants in water.

Also, because the β-manganese dioxide nanoparticles are supported on the carbon nanotube support, a loss of the β-manganese dioxide nanoparticles is prevented, leading to application to a commercialization process.

Further, when the carbon nanotube support having the β-manganese dioxide nanoparticles immobilized thereon is applied together with an oxidant, the organic pollutants removal performance can be further improved.

BRIEF DESCRIPTION OF THE DRAWINGS

The accompanying drawings illustrate a preferred embodiment of the present disclosure, and together with the foregoing disclosure, serve to provide further understanding of the technical spirit of the present disclosure, and thus, the present disclosure is not construed as being limited to the drawings.

| Description of Numerals | |
|---|---|
| 100: Water treatment apparatus | 110: Water collection tank |
| 120: Pump | 130, 230: Chemicals tank |
| 140, 240: Chemicals pump | 150: Reaction tank |
| 151, 251: Water treatment agent | 160: Treated water tank |
| 200: In-situ groundwater treatment apparatus | |
| 250: Permeable reactive barrier | |

BEST MODE

Hereinafter, the present disclosure is described in detail. It should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Furthermore, the disclosure depicted in the embodiments described herein are just one most preferred example of the present disclosure, not intended to represent all the technical aspects of the present disclosure, so it should be understood that alternatives, other equivalents and modifications would be made thereto at the time the present application is filed.

Figure 1:
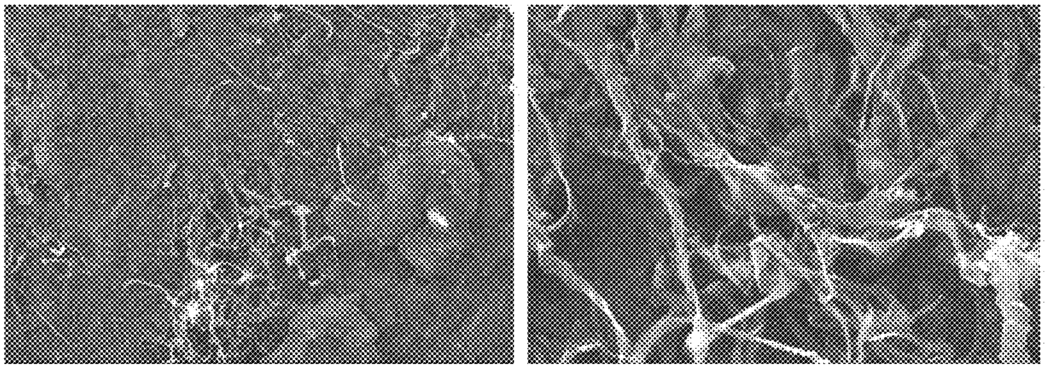
FIG. 1 shows a scanning electron microscope (SEM) image of a carbon nanotube support according to one embodiment of the present disclosure.
Figure 2:
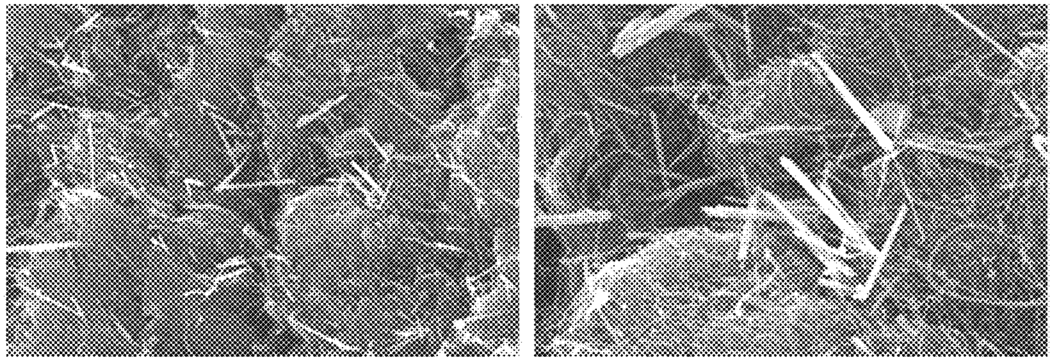
FIG. 2 shows a SEM image of a carbon nanotube support having needle-shaped β-manganese dioxide nanoparticles immobilized thereon according to one embodiment of the present disclosure.

FIG. 1 shows a scanning electron microscope (SEM) image of a carbon nanotube support according to one embodiment of the present disclosure, and FIG. 2 shows a SEM image of a carbon nanotube support having needle-shaped β-manganese dioxide nanoparticles immobilized thereon according to one embodiment of the present disclosure.

Hereinafter, referring to FIGS. 1 and 2, a water treatment agent of the present disclosure includes a carbon nanotube support; and β-manganese dioxide nanoparticles immobilized on the carbon nanotube support, in which the β-manganese dioxide nanoparticles have a particle size less than or equal to 1,000 nm.

The water treatment agent of the present disclosure includes a carbon nanotube support having needle-shaped β-manganese dioxide nanoparticles immobilized thereon as shown in FIG. 2.

Figure 3:
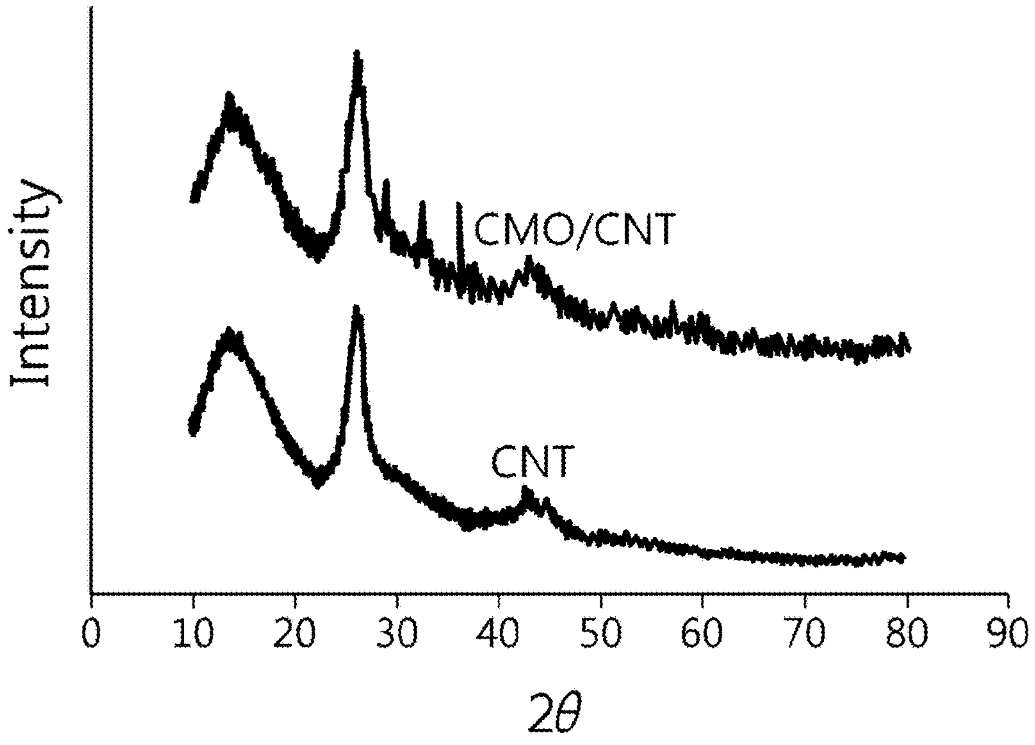
FIG. 3 is a graph showing X-Ray Diffraction (XRD) analysis results of carbon nanotubes (CNTs) and a carbon nanotube support having β-manganese dioxide nanoparticles immobilized thereon (CMO/CNT) according to one embodiment of the present disclosure.

On the other hand, FIG. 3 is a graph showing X-Ray Diffraction (XRD) analysis results of carbon nanotubes (CNTs) and a carbon nanotube support having β-manganese dioxide nanoparticles immobilized thereon (CMO/CNT) according to one embodiment of the present disclosure.

Referring to FIG. 3, a peak appears in the carbon nanotube support having β-manganese dioxide nanoparticles immobilized thereon (CMO/CNT), while no peak appears in the carbon nanotubes (CNTs), and it is a characteristic peak of β-manganese dioxide nanoparticles, which signifies that the β-manganese dioxide nanoparticles are immobilized and supported on the carbon nanotubes.

Also, the following Table 1 shows Energy Dispersive X-ray Spectroscopy (EDS) results of carbon nanotubes (CNTs) and the carbon nanotube support having β-manganese dioxide nanoparticles immobilized thereon (CMO/CNT) according to one embodiment of the present disclosure. It can be seen that the CMO/CNT of the present disclosure includes a large amount of manganese.

TABLE 1

| | CNT | | CMO/CNT | |
|---|---|---|---|---|
| Element | Weight % | Atomic % | Weight % | Atomic % |
| C | 91.11 | 93.59 | 61.91 | 80.98 |
| O | 7.96 | 6.14 | 11.68 | 11.47 |
| S | 0.2 | 0.08 | — | — |
| Cl | 0.3 | 0.1 | — | — |
| Fe | 0.43 | 0.1 | — | — |
| Mn | — | — | 26.41 | 7.55 |
| Total | 100 | 100 | 100 | 100 |

On the other hand, as compared to particles at micro and larger scales, the manganese oxide nanoparticles have a large specific surface area and rich reactive sites and adsorption sites on the surface, so adsorptive removal performance of heavy metals and adsorption and oxidative removal performance of organic pollutants is far superior.

According to earlier studies, metal oxide nanoparticles are known as having a far higher pollutant removal speed than micro-sized particles (Zhang, 2003). Particularly, because manganese oxide nanoparticles have a high oxidation-reduction potential, they show outstanding performance in the oxidation and degradation of organic pollutants (Zhao et al., 2006).

However, laboratory-scale studies have been conducted in the related field until now, and in spite of outstanding pollutant removal performance as described above, manganese oxide nanoparticles have a problem with a loss in a real reactor, so they could not be used in a practical water treatment process.

In this context, the present disclosure solved the problem with a loss in a reactor by immobilizing and supporting β-manganese dioxide nanoparticles on a carbon nanotube support to easily separate β-manganese dioxide nanoparticles from water to be treated.

Because β-manganese dioxide has higher specific surface area and higher average oxidation states than other manganese dioxide (α-manganese dioxide and γ-manganese dioxide), it has higher catalytic activity than other manganese dioxide (Zhang et al., 2009).

Also, β-manganese dioxide nanoparticles are better than hydrogen peroxide at removing refractory organic pollutants, dyes, and when used with an oxidant (hydrogen peroxide, etc.), dye removal rates are greatly improved (Zhang et al, 2006). In addition, β-manganese dioxide nanoparticles do not change in properties even though an oxidant (hydrogen peroxide, etc.) exists (Wang et al., 2006), and even after reused five times, they do not reduce in catalytic activity (Zhang et al., 2006), so they can be used for a long time, which gives an advantage to them.

According to the present disclosure, β-manganese dioxide nanoparticles are immobilized on a carbon nanotube support capable of adsorbing organic pollutants, so adsorptive removal and oxidative removal can be achieved at the same time, thereby improving removal rates of organic pollutants in water.

Particularly, carbon nanotubes are light and highly adaptable in their application, are chemically and thermally stable, and have excellent mechanical and electrical properties, so they are far superior in the immobilization of nanoparticles.

On the other hand, the size of the β-manganese dioxide nanoparticles may be from 1 nm to 100 nm. When the numerical range is satisfied, adsorption performance of heavy metals or organic pollutants is further improved.

Also, the β-manganese dioxide nanoparticles may be formed singularly, but may be formed by agglomerating at least two particles.

Further, when the water treatment agent further includes an oxidant, the pollutant removal performance by catalytic oxidation can be further improved.

In this instance, the oxidant may be any one selected from the group consisting of hydrogen peroxide ($H_2O_2$), ozone ($O_3$), sodium hypochlorite (NaOCl), ultraviolet light, electron beam, γ-ray, hydrodynamic cavitation and sonication, or mixtures thereof.

Figure 4:
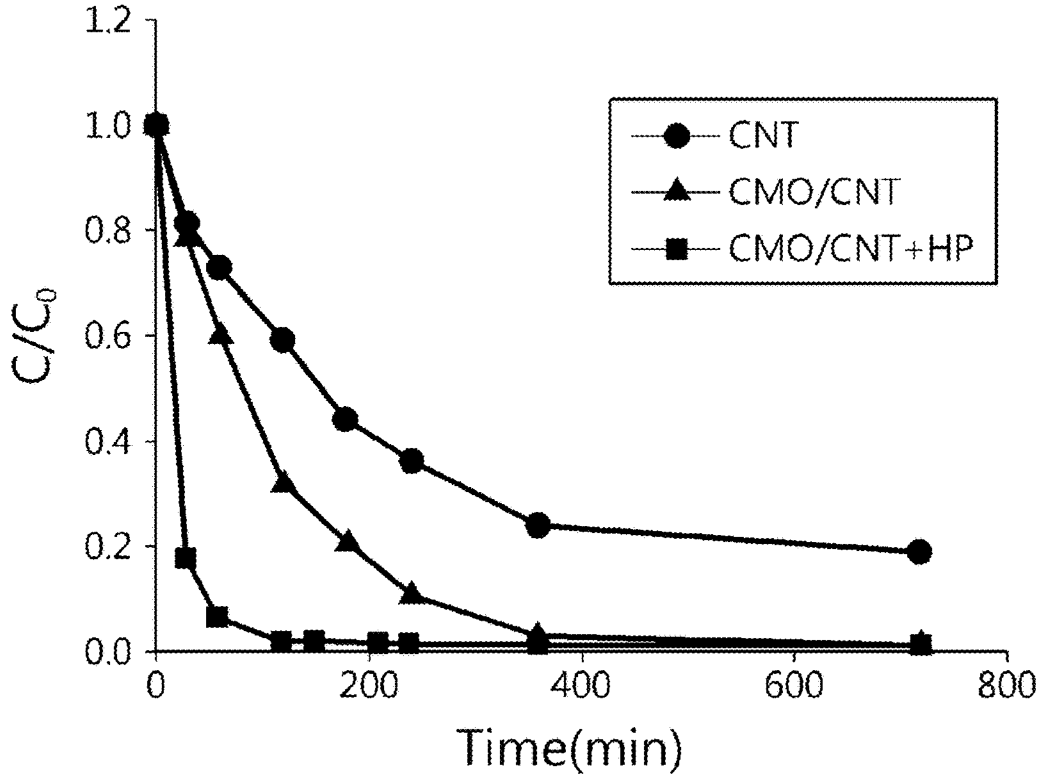
FIG. 4 is a graph showing removal test results of an endocrine disrupting chemical 17α-ethinylestradiol (EE2) using carbon nanotubes (CNTs), a water treatment agent (CMO/CNT) according to one embodiment of the present disclosure, and a mixture of the water treatment agent and hydrogen peroxide (CMO/CNT+HP).

On the other hand, FIG. 4 is a graph showing removal test results of 17α-ethinylestradiol (EE2) which is one of the highly toxic endocrine disruption chemicals (EDCs), using carbon nanotubes (CNTs), a water treatment agent (CMO/CNT) according to one embodiment of the present disclosure, and a mixture (CMO/CNT+HP) of the water treatment agent and hydrogen peroxide (HP).

Referring to FIG. 4, the carbon nanotubes having β-manganese dioxide nanoparticles immobilized thereon (CMO/CNT) was found to have higher EE2 removal speed and removal rate than the carbon nanotubes (CNTs), and the mixture (CMO/CNT+HP) of CMO/CNT and hydrogen peroxide was found to have higher EE2 removal speed and removal rate than the CMO/CNT. In this instance, the initial concentration of the EE2 was 4 mg/L, the concentration of the CMO/CNT was 100 mg/L, the concentration of the hydrogen peroxide was 1,000 mg/L.

Figure 5:
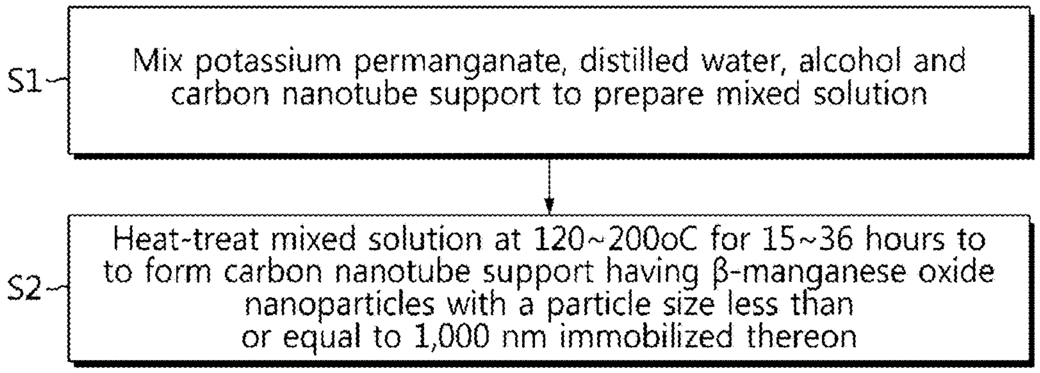
FIG. 5 is a flowchart showing a method of preparing a water treatment agent according to one embodiment of the present disclosure.

On the other hand, FIG. 5 is a flowchart showing a method of preparing a water treatment agent according to one embodiment of the present disclosure. Hereinafter, the method of preparing a water treatment agent according to the present disclosure is described with reference to FIG. 5.

First, potassium permanganate, distilled water, alcohol and a carbon nanotube support are mixed to prepare a mixed solution (S1).

In this instance, a weight ratio of the potassium permanganate and the distilled water may be from 1:50 to 1:200, and if the numerical range is satisfied, a maximum amount of β-manganese dioxide nanoparticles having an optimum size can be supported on carbon nanotubes. In relation to the weight ratio, if an amount of the distilled water exceeds the numerical range, an amount of potassium permanganate which forms β-manganese dioxide nanoparticles is relatively low, reducing an amount of β-manganese dioxide nanoparticles immobilized on carbon nanotubes, and as a consequence, reducing pollutant removal efficiency. On the contrary, if an amount of the distilled water is less than the numerical range, an amount of potassium permanganate which forms β-manganese dioxide nanoparticles is relatively high, forming an excessive amount of β-manganese dioxide nanoparticles. In this instance, an amount of β-manganese dioxide nanoparticles immobilized on carbon nanotubes increases, but the formed β-manganese dioxide nanoparticles aggregate together and act as a single particle larger than nanoparticles, reducing the pollutant removal efficiency.

Also, a volume ratio of the distilled water and the alcohol may be from 1:20 to 1:150. If the volume ratio of the distilled water and the alcohol satisfies the numerical range, crystallinity is high, making it create sufficient temperature, pressure and oxidation conditions to form β-manganese dioxide nanoparticles with high pollutant oxidation efficiency. However, in relation to the volume ratio, if an amount of the alcohol exceeds the numerical range, the pressure and temperature may rise too much, resulting in modification of thermal decomposition of the generated β-manganese dioxide nanoparticles.

Also, to increase an amount of immobilization and immobilization performance of the β-manganese dioxide on the carbon nanotube support, the carbon nanotube support may be pre-treated using acids, alkalis, and salts.

A method of pre-treating the carbon nanotube support is as follows.

First, a carbon nanotube support to be pre-treated is impregnated with an aqueous solution such as hydrochloric acid (HCl), nitric acid ($HNO_3$), sulfuric acid ($H_2SO_4$), sodium chloride (NaCl), sodium hydroxide (NaOH) for a predetermined period of time. Subsequently, the impregnated carbon nanotube support is separated from the aqueous solution by precipitation or filtration. Subsequently, the separated carbon nanotube support is dried, yielding a pre-treated carbon nanotube support.

Subsequently, the mixed solution is heat-treated at 120~200° C. for 15~36 hours, to form a carbon nanotube support having β-manganese dioxide nanoparticles of a particle size less than or equal to 1,000 nm immobilized thereon (S2).

On the other hand, in addition to the carbon nanotube support having β-manganese dioxide nanoparticles immobilized thereon, a product after the step (S2) may include reaction by-products, and when they are removed and washing and drying is performed, only the carbon nanotube support having β-manganese dioxide nanoparticles immobilized thereon may be separated.

Also, to improve the crystallinity of the carbon nanotube support having β-manganese dioxide nanoparticles immobilized thereon, after the step (S2), the method may further include heat-treating at 250 to 500° C. for 2 to 8 hours, followed by cooling. Thereby the quality and purity of the water treatment agent may be further improved.

The carbon nanotube support having β-manganese dioxide nanoparticles immobilized thereon as described above may be used in various fields including general water treatment, water recycling, and treatment of soils and groundwater, and related markets are wide.

Figure 6:
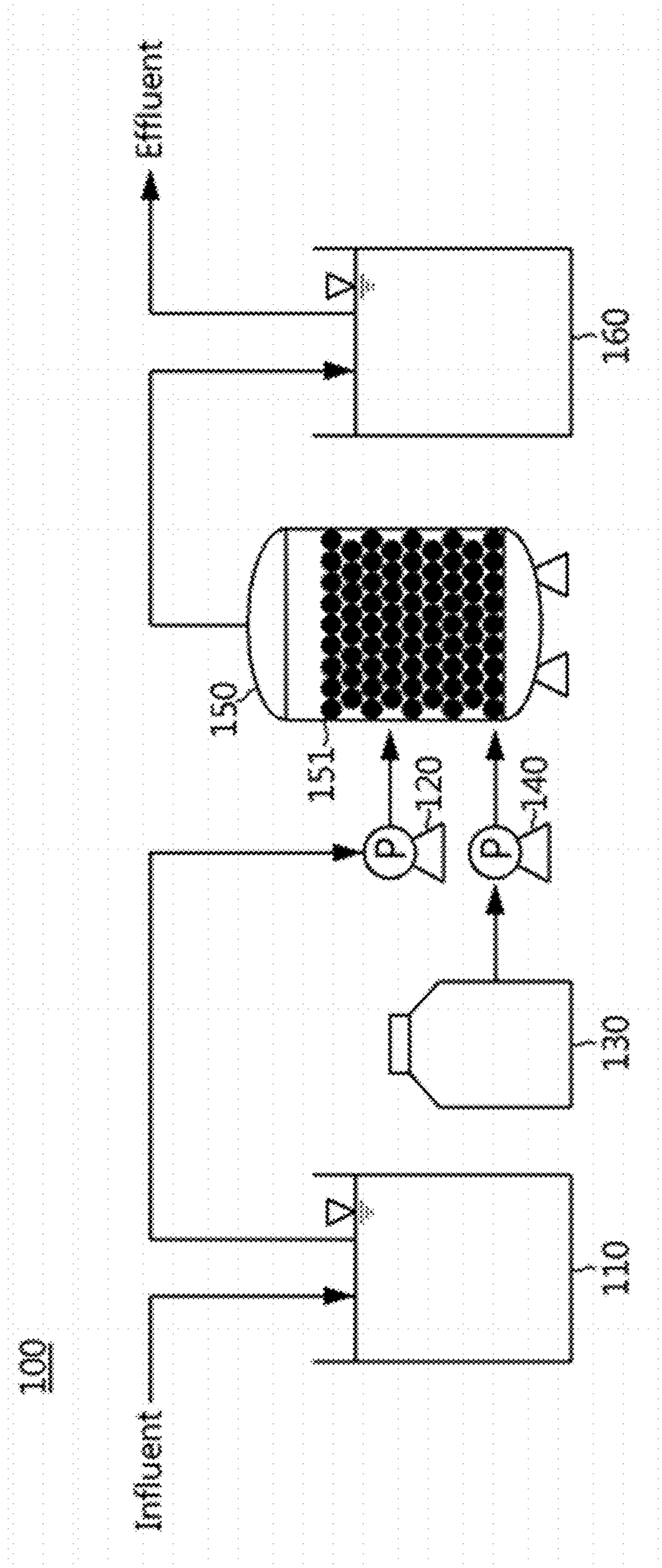
FIG. 6 is an outline diagram showing a water treatment apparatus including a reaction tank filled with a water treatment agent according to one embodiment of the present disclosure.
Figure 7:
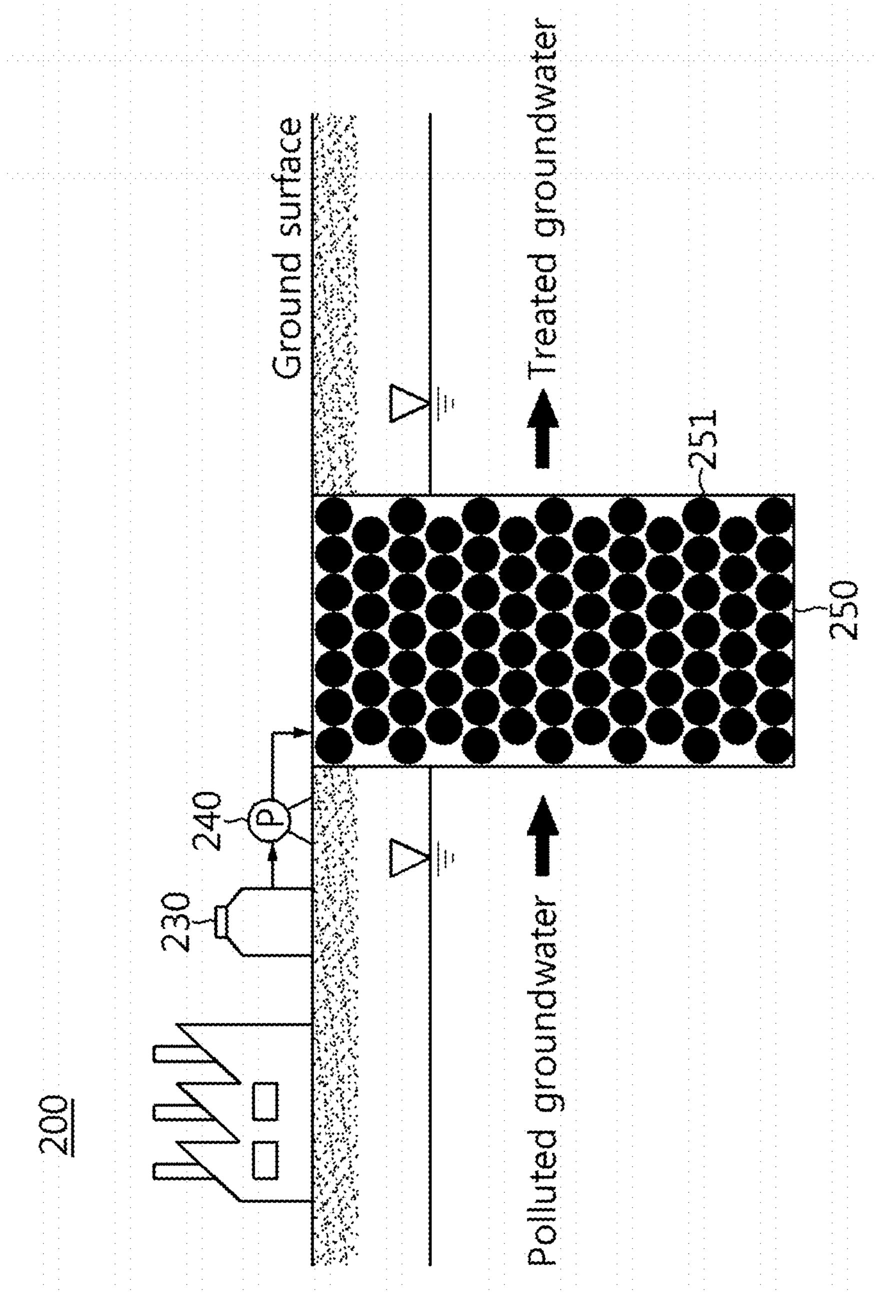
FIG. 7 is an outline diagram showing an in-situ groundwater treatment apparatus including a permeable reactive barrier filled with a water treatment agent according to one embodiment of the present disclosure.

FIGS. 6 and 7 are outline diagrams respectively showing a water treatment apparatus including a reaction tank and an in-situ groundwater treatment apparatus including a permeable reactive barrier.

Hereinafter, referring to FIGS. 6 and 7, for the water treatment apparatus 100 including the reaction tank 150 according to the present disclosure, the reaction tank 150 is filled with a water treatment agent 151 according to the present disclosure as described above. In this instance, according to necessity, the reaction tank 150 may be driven as fixed bed or fluidized bed. Also, according to necessity, the reaction tank 150 may be driven by up-flow or down-flow. Further, when needed, to improve the treatment efficiency, a chemical (an oxidant) may be further fed.

Also, for the in-situ groundwater treatment apparatus 200 including the permeable reactive barrier 250 according to the present disclosure, the permeable reactive barrier 250 is filled with a water treatment agent 251 according to the present disclosure as described above. In this instance, according to necessity, to improve the treatment efficiency, a chemical (an oxidant) may be further fed.

As described above, the water treatment agent according to the present disclosure may be applied to various water treatment including surface water and groundwater treatment and sewage recycling. In this instance, surface water and groundwater is used as a water source for a water purification process, and for water recycling, removal of toxic trace elements is required to produce safe recycled water.

Particularly, recently, water resources of good quality are in shortage due to water resource pollution, climate change, and population growth and water demand exceeds water supply, so the world's population suffering water shortages is about 0.7 billion people in 2008 and will be about 3 billion people by 2025 (UN, 2007). Therefore, for the benefit of supply of water resources of good quality in sufficient amount, there is an urgent need for appropriate treatment technology of toxic trace elements in all water purification and sewage/wastewater treatment, and the water treatment agent according to the present disclosure may be a solution to the above problem.

While the embodiments of the present disclosure disclosed hereinabove present merely particular examples to help the understanding, such embodiments are not intended to limit the scope of the present disclosure. It is obvious to those skilled in the art that in addition to the disclosed embodiments, modifications may be made based on the technical features of the present disclosure.

What is claimed is:

1. A water treatment agent comprising:

a carbon nanotube support; and

β-manganese dioxide nanoparticles immobilized on the carbon nanotube support, in which the β-manganese dioxide nanoparticles have a particle size less than or equal to 1,000 nm.

2. The water treatment agent according to claim 1, wherein the β-manganese dioxide nanoparticles have a size of from 1 nm to 100 nm.

3. The water treatment agent according to claim 1, wherein the β-manganese dioxide nanoparticles are formed singularly, or by agglomerating at least two particles.

4. The water treatment agent according to claim 1, wherein the water treatment agent further comprises an oxidant.

5. The water treatment agent according to claim 4, wherein the oxidant is any one selected from the group consisting of hydrogen peroxide ($H_2O_2$), ozone ($O_3$), and sodium hypochlorite (NaOCl), or mixtures thereof.

6. A water treatment apparatus comprising a reaction tank, wherein the reaction tank is filled with a water treatment agent according to claim 1.

7. An in-situ groundwater treatment apparatus comprising a permeable reactive barrier, wherein the permeable reactive barrier is filled with a water treatment agent according to claim 1.

8. A method of preparing a water treatment agent, comprising:

(S1) mixing potassium permanganate, distilled water, alcohol and a carbon nanotube support to prepare a mixed solution; and (S2) heat-treating the mixed solution at 120 to 200° C. for 15 to 36 hours, to form a carbon nanotube support having β-manganese dioxide nanoparticles of a particle size less than or equal to 1,000 nm immobilized thereon.

9. The method of preparing a water treatment agent according to claim 8, after the step (S2), further comprising:

(S3) heat-treating the carbon nanotube support having β-manganese dioxide nanoparticles immobilized thereon at 250 to 500° C. for 2 to 8 hours.

10. The method of preparing a water treatment agent according to claim 8, wherein a weight ratio of the potassium permanganate and the distilled water is from 1:50 to 1:200.

11. The method of preparing a water treatment agent according to claim 8, wherein a volume ratio of the distilled water and the alcohol is from 1:20 to 1:150.

* * * * *